US008163847B2

(12) United States Patent
Zarnoch et al.

(10) Patent No.: US 8,163,847 B2
(45) Date of Patent: *Apr. 24, 2012

(54) CAPPED POLY(ARYLENE ETHER) COMPOSITION AND PROCESS

(75) Inventors: Kenneth Paul Zarnoch, Scotia, NY (US); John Robert Campbell, Clifton Park, NY (US); Amy Rene Freshour, Putte (NL); Hua Guo, Selkirk, NY (US); John Austin Rude, Ballston Lake, NY (US); Prameela Susarla, Clifton Park, NY (US); Michael Alan Vallance, Loudonville, NY (US); Gary William Yeager, Rexford, NY (US)

(73) Assignee: Sabic Innovative Plastics IP B.V. (NL)

( * ) Notice: Subject to any disclaimer, the term of this patent is extended or adjusted under 35 U.S.C. 154(b) by 154 days.

This patent is subject to a terminal disclaimer.

(21) Appl. No.: 12/634,922

(22) Filed: Dec. 10, 2009

(65) Prior Publication Data
US 2010/0087591 A1 Apr. 8, 2010

Related U.S. Application Data

(63) Continuation of application No. 11/467,723, filed on Aug. 28, 2006, now Pat. No. 7,655,734, which is a continuation of application No. 10/678,243, filed on Oct. 3, 2003, now Pat. No. 7,148,296.

(51) Int. Cl.
C08F 283/08 (2006.01)
C08G 65/38 (2006.01)

(52) U.S. Cl. ........ 525/391; 525/534; 526/263; 526/280; 526/313; 526/319; 526/323.1; 526/346; 526/347.1; 528/176; 528/192; 528/495; 528/496

(58) Field of Classification Search .......................... None
See application file for complete search history.

(56) References Cited

U.S. PATENT DOCUMENTS

| | | | |
|---|---|---|---|
| 3,219,625 A | 11/1965 | Blanchard | |
| 3,306,874 A | 2/1967 | Hay | |
| 3,306,875 A | 2/1967 | Hay | |
| 3,375,228 A | 3/1968 | Holoch et al. | |
| 3,496,236 A | 2/1970 | Cooper et al. | |
| 4,028,341 A | 6/1977 | Hay | |
| 4,048,143 A | 9/1977 | Hay | |
| 4,092,294 A | 5/1978 | Bennett | |
| 4,140,675 A | 2/1979 | White | |
| 4,148,843 A | 4/1979 | Goossens | |
| 4,165,422 A | 8/1979 | White | |
| 4,521,584 A | 6/1985 | Heitz et al. | |
| 4,562,243 A | 12/1985 | Percec | |
| 4,634,742 A | 1/1987 | Percec | |
| 4,663,402 A | 5/1987 | Percec et al. | |
| 4,665,137 A | 5/1987 | Percec et al. | |
| 4,677,185 A | 6/1987 | Heltz et al. | |
| 4,701,514 A | 10/1987 | Percec | |
| 4,760,118 A | 7/1988 | White et al. | |
| H521 H | 9/1988 | Fan | |
| 4,806,601 A | 2/1989 | Percec | |
| 4,806,602 A | 2/1989 | White et al. | |
| 4,888,397 A | 12/1989 | van der Meer | |
| 4,923,932 A | 5/1990 | Katayose et al. | |
| 5,039,781 A | 8/1991 | Neugebauer et al. | |
| 5,071,922 A | 12/1991 | Nelissen et al. | |
| 5,079,268 A | 1/1992 | Nelissen et al. | |
| 5,091,480 A | 2/1992 | Percec | |
| 5,171,761 A | 12/1992 | Penco et al. | |
| 5,171,825 A * | 12/1992 | Hedtmann-Rein et al. | ... 528/214 |
| 5,194,517 A * | 3/1993 | Blubaugh et al. | ............. 525/396 |
| 5,218,030 A | 6/1993 | Katayose et al. | |
| 5,219,951 A | 6/1993 | Nelissen et al. | |
| 5,258,455 A | 11/1993 | Laughner et al. | |
| 5,304,600 A | 4/1994 | Nelissen et al. | |
| 5,310,820 A | 5/1994 | Nelissen et al. | |
| 5,352,745 A | 10/1994 | Katayose et al. | |
| 5,407,972 A | 4/1995 | Smith et al. | |
| 5,834,565 A | 11/1998 | Tracy et al. | |
| 5,880,221 A | 3/1999 | Liska et al. | |
| 5,965,663 A | 10/1999 | Hayase | |
| 5,998,533 A * | 12/1999 | Weber et al. | .................. 524/540 |
| 6,051,662 A | 4/2000 | Tracy et al. | |
| 6,166,137 A | 12/2000 | Brown et al. | |

(Continued)

FOREIGN PATENT DOCUMENTS

DE 3117514 A1 2/1981

(Continued)

OTHER PUBLICATIONS

H. Nava et al., "Functional Polymers and Sequential Copolymers by Phase Transfer Catalysis. 18. Synthesis and Characterization of α, w-bis((2,6-dimethylphenol)-poly(2,6-dimethyl-1,4-phenylene oxide) and α, w-bis(vinylbenzyl)- poly(2,6-dimethyl-14-phenylene oxide) Oligomers", Journal of Polymer Science: Part A: Polymer Chemistry, vol. 24, 965-990 (1986).
W. Heitz et al., "Synthesis of Telechelic Hard and Soft Segments", Polymer Preprints (American Chemical Society, Division of Polymer Chemistry) (1984), vol. 25, No. 1, pp. 136-137.
DE3117514A1; May 2, 1981; Translation; 8 pages.
DE4103140A1; Feb. 2, 1991; Translation; 7 pages.
Chemical Abstract 109:171608; JP63083152A2; Apr. 13, 1988 (2 pages).
Chemical Abstract 98:73296; JP57145148A2; Sep. 8, 1982 (2 pages).
Chemical Abstract 99:213561; JP58141240A2; Aug. 22, 1983 ( 2 pages).

(Continued)

Primary Examiner — Marc Zimmer
(74) Attorney, Agent, or Firm — Cantor Colburn LLP

(57) ABSTRACT

A thermoset composition exhibiting reduced water absorption in the cured state includes an olefinically unsaturated monomer and a capped poly(arylene ether) prepared by the reaction of an uncapped poly(arylene ether) with an anhydride capping agent. The capped poly(arylene ether) is isolated and/or purified by methods that reduce the concentrations of polar impurities that contribute to water absorption by the cured composition.

2 Claims, No Drawings

U.S. PATENT DOCUMENTS

| | | | |
|---|---|---|---|
| 6,251,308 B1 | 6/2001 | Butler | |
| 6,306,963 B1 | 10/2001 | Lane et al. | |
| 6,306,978 B1 | 10/2001 | Braat et al. | |
| 6,307,010 B1 | 10/2001 | Braat et al. | |
| 6,352,782 B2 | 3/2002 | Yeager et al. | |
| 6,384,176 B1 | 5/2002 | Braat et al. | |
| 6,469,124 B2 | 10/2002 | Braat et al. | |
| 6,521,703 B2 | 2/2003 | Zarnoch et al. | |
| 6,569,982 B2 | 5/2003 | Hwang et al. | |
| 6,576,700 B2 | 6/2003 | Patel | |
| 6,593,391 B2 | 7/2003 | Teutsch et al. | |
| 6,617,398 B2 | 9/2003 | Yeager et al. | |
| 6,627,704 B2 | 9/2003 | Yeager et al. | |
| 6,627,708 B2 | 9/2003 | Braat et al. | |
| 6,780,959 B2 | 8/2004 | Braat et al. | |
| 6,794,481 B2 | 9/2004 | Amagai et al. | |
| 6,812,276 B2 | 11/2004 | Yeager | |
| 6,835,785 B2 | 12/2004 | Ishii et al. | |
| 6,841,629 B1 | 1/2005 | Mutsumi et al. | |
| 6,878,781 B2 | 4/2005 | Zarnoch et al. | |
| 6,878,782 B2 | 4/2005 | Merfeld et al. | |
| 6,878,783 B2 | 4/2005 | Yeager et al. | |
| 6,897,282 B2 | 5/2005 | Freshour et al. | |
| 6,905,637 B2 | 6/2005 | Yeager et al. | |
| 6,962,965 B2 | 11/2005 | Yeager et al. | |
| 7,067,595 B2 | 6/2006 | Zarnoch et al. | |
| 7,071,266 B2 | 7/2006 | Ishii et al. | |
| 7,119,136 B2 | 10/2006 | Campbell et al. | |
| 7,148,296 B2 * | 12/2006 | Zarnoch et al. | 525/534 |
| 7,235,192 B2 | 6/2007 | Yeager et al. | |
| 7,329,708 B2 | 2/2008 | Birsak et al. | |
| 7,655,734 B2 * | 2/2010 | Zarnoch et al. | 525/391 |
| 2002/0028337 A1 | 3/2002 | Yeager et al. | |
| 2003/0023006 A1 | 1/2003 | Patel | |
| 2003/0093123 A1 | 5/2003 | Yeager et al. | |
| 2003/0194562 A1 | 10/2003 | Ishii et al. | |
| 2003/0215588 A1 | 11/2003 | Yeager et al. | |
| 2003/0220460 A1 | 11/2003 | Merfeld | |
| 2004/0018319 A1 | 1/2004 | Waldfried et al. | |
| 2004/0054121 A1 | 3/2004 | Peemans et al. | |
| 2004/0102583 A1 | 5/2004 | Freshour et al. | |
| 2004/0106750 A1 | 6/2004 | Yeager et al. | |
| 2004/0146692 A1 | 7/2004 | Inoue et al. | |
| 2004/0147715 A1 | 7/2004 | Ishii et al. | |
| 2004/0152848 A1 | 8/2004 | Ishii et al. | |
| 2004/0225082 A1 | 11/2004 | Mutsumi et al. | |
| 2004/0258852 A1 | 12/2004 | Ohno et al. | |
| 2004/0265595 A1 | 12/2004 | Tokiwa et al. | |
| 2005/0032979 A1 | 2/2005 | Yeager | |
| 2005/0065241 A1 | 3/2005 | Ishii et al. | |
| 2005/0070685 A1 | 3/2005 | Mitsui et al. | |
| 2005/0075462 A1 | 4/2005 | Zarnoch et al. | |
| 2005/0075463 A1 | 4/2005 | Zarnoch et al. | |
| 2005/0187373 A1 | 8/2005 | Yeager | |
| 2006/0160982 A1 | 7/2006 | Ishii et al. | |

FOREIGN PATENT DOCUMENTS

| | | |
|---|---|---|
| DE | 4103140 A1 | 2/1991 |
| EP | 0261574 B1 | 11/1991 |
| EP | 0550209 A2 | 12/1992 |
| WO | WO 01/40354 | 6/2001 |
| WO | 2004078845 A1 | 9/2004 |

OTHER PUBLICATIONS

JP02199176; Publication Date Jul. 8, 1990; Abstract Only (1 page).

European Search Report, Application No. 03254223.5; Date of Completion of Search Sep. 5, 2003 (4 pages).

Heitz et al., Synthesis of Telechelic Hard and Soft Segments, Polymer Preprints (American Chemical Society, Division of Polymer Chemistry) (1984), vol. 25, No. 1, pp. 136-137.

Krijgsmann et al., Synthesis and charaterisation of telechelic poly(2,6-dimethyl-1,4-phenylene ether) for copolymerisation, Polymer 44 (2003) 7055-7065.

Nava et al., Functional Polymers and Sequential Copolymers by Phase Transfer Catalysis. 18. Synthesis and Characterization of a,w-bis(2,6-dimethylphenol)-poly(2,6-dimethyl-1,4-phenylene oxide) and a,w-bis(vinylbenzyl)-poly(2,6-dimethyl-1,4-phenylene oxide) Oligomers, Journal of Polymer Science, Part A: Polymer Chemistry, vol. 24, 965-990, 1986.

Percec et al., Synthesis of a,w-bis(2,6-dimethylphenol)-poly(2,6-dimethyl-1,4-phenylene oxide) by phase transfer catalyzed polymerization of 4-bromo-2, 6-dimethylphenol in the presence of 2,2-di(4-hydroxy-3,5-dimethylphenyl) propane, Polymer Bulletin 24, 493-500 (1900).

Risse et al., Preparation and characterization of poly[oxy(2,6-dimethyl-1,4-phenylene)] with functional end groups, Makromol, Chem. 186, 1835-1853 (1985).

Dwain M. White, The Synthesis of 4-Hydroxyarylene Ethers by the Equilibration of Phenols with Poly(2,6-dimethyl-1, 4-phenylene ether), Journal of Organic Chemistry, vol. 34, No. 2, Feb. 1969, pp. 297-303.

Dwain White, Reactions of Poly(phenylene Oxide)s with Quinones. I. The Quinone-Coupling Reaction Between Low-Molecular-Weight Poly(2,6-Dimethyl-1,4-Phenylene Oxide) and 3,3',5,5'-Tetramethyl-4,4'-Diphenoquinone, Journal of Polymer Science, olymer Chemistry Edition, vol. 190, 1367-1383 (1981).

Walter Hohenberger "Fillers and Reinforcements/Coupling Agents" Plastics Additives Handbook, 4th Edition R. Gachter and H. Muller (eds.), P.P. Klemchuck (assoc. ed.) Hanser Publishers, New York 1993, pp. 901-948.

Lawrence B. Cohen "Zicroaluminates strengthen premium ranges of chemical coupling agents," Plastics Engineering, vol. 39, No. 11, p. 29-31.

K.P. Chan, et al. "Facile Quantitative Analysis of Hydroxyl End Groups of Poly (2,6-dimethyl-1,4-phenylene oxide)s by 31 P NMR Spectroscopy," Macromolecules, 1994 vol. 27 pp. 6371-6375.

C. Pugh and V Percec, Polym. Prepr. (Am, Chem. Soc., Div, Polym. Chem) 1985, 26(2) 303-305.

International Search Report; International Application No. PCT/US2004/031880; International Filing Date Sep. 29, 2009; 3 pages.

* cited by examiner

CAPPED POLY(ARYLENE ETHER) COMPOSITION AND PROCESS

CROSS-REFERENCE TO RELATED APPLICATIONS

This application is a continuation of application Ser. No. 11/467,723, filed Aug. 28, 2006, which is a continuation of application Ser. No. 10/678,243 filed Oct. 3, 2003 (and issued as U.S. Pat. No. 7,148,296). The priority applications are incorporated by reference herein in their entirety.

BACKGROUND OF THE INVENTION

Curable compositions with polymerizable poly(arylene ether) resins and co-monomers such as styrene and acrylate esters have been described, for example, in U.S. Pat. No. 6,352,782 B2 to Yeager et al, and U.S. Patent Application Publication No. 2001-0053820 A1 to Yeager et al. One potential use for such compositions is for fabricating plastic-packaged electronic devices. Experience in the fabrication of these devices has suggested the need for curable compositions that retain less water in the cured state.

BRIEF DESCRIPTION OF THE INVENTION

One embodiment is a curable composition, comprising: an olefinically unsaturated monomer; and a capped poly(arylene ether) prepared by the reaction of an uncapped poly(arylene ether) with an anhydride capping agent; wherein the composition after curing absorbs less than 1 weight percent water after 7 days at 85° C. and 85 percent relative humidity.

Other embodiments, including a cured composition, an article comprising a cured composition, and a method of preparing a curable composition, are described in detail below.

DETAILED DESCRIPTION OF THE INVENTION

One use of curable thermoset compositions is as a packaging material for plastic-packaged electronic devices. Manufacturing experience in this field has revealed that the electronic devices are sometimes damaged during soldering by vaporization of water that has been absorbed by the cured thermoset composition. The resulting damage may include delamination of plastic from the device, the device substrate, or other interfaces, as well as blistering of plastic above the device and cracking in the plastic packaging. To avoid these problems, devices are typically baked to dryness immediately before assembly. In other cases, the electronic devices are handled in a dry nitrogen atmosphere. This experience suggested a need for curable thermoset compositions that exhibit reduced water absorption in the cured state. Such compositions would allow simpler processes and improved efficiency in the manufacture of plastic-packaged electronic devices.

After extensive research, the present inventors have found that the water retention of cured articles prepared from curable poly(arylene ether) compositions may depend on the method of preparation and isolation of the polymerized poly(arylene ether) macromer. Specifically, when the poly(arylene ether) with one or more capping groups (i.e., a capped poly(arylene ether)) is prepared by the reaction of an uncapped poly(arylene ether) with an anhydride capping agent, the capped poly(arylene ether) may retain variable amounts of the anhydride capping agent and its hydrolysis product(s), depending on the method of preparation. When an amine catalyst is used in the capping reaction, its presence in the curable composition may also contribute to water absorption in the cured state. The amine catalyst may also form a salt with a free acid hydrolysis product of the anhydride, either by reaction of the amine with the free acid or the anhydride itself. As demonstrated in the examples below, water absorption by the cured composition was found to increase with increasing amounts of these polar impurities. The present inventors have found that various methods of reducing these polar impurities permit the formulation of a curable composition that absorbs less water in the cured state.

One embodiment is a curable composition, comprising: an olefinically unsaturated monomer; and a capped poly(arylene ether) prepared by the reaction of an uncapped poly(arylene ether) with an anhydride capping agent; wherein the composition after curing absorbs less than 1 weight percent water after 7 days at 85° C. and 85 percent relative humidity.

The curable composition includes a capped poly(arylene ether) prepared by the reaction of an uncapped poly(arylene ether) with an anhydride capping agent. A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent. The capped poly(arylene ether) may be represented by the structure $$Q(J-K)_y$$

wherein Q is the residuum of a monohydric, dihydric, or polyhydric phenol, preferably the residuum of a monohydric or dihydric phenol, more preferably the residuum of a monohydric phenol; y is 1 to 100; J comprises repeating structural units having the formula

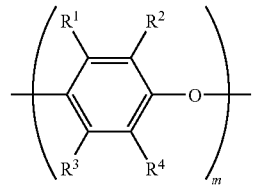

wherein m is 1 to about 200, preferably 2 to about 200, and $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ amino alkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; and K is a capping group produced by reaction of a free phenolic hydroxyl group on the poly(arylene ether) with an anhydride capping agent. The resulting capping group may be

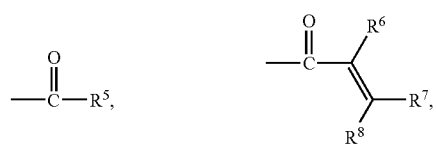

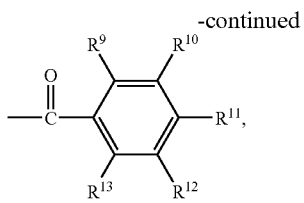

or the like, wherein $R^5$ is $C_1$-$C_{12}$ hydrocarbyl optionally substituted with one or two carboxylic acid groups, or the like; $R^6$-$R^8$ are each independently hydrogen, $C_1$-$C_{18}$ hydrocarbyl optionally substituted with one or two carboxylic acid groups, $C_2$-$C_{18}$ hydrocarbyloxycarbonyl, nitrile, formyl, carboxylic acid, imidate, thiocarboxylic acid, or the like; and $R^9$-$R^{13}$ are each independently hydrogen, halogen, $C_1$-$C_{12}$ alkyl, hydroxy, amino, carboxylic acid (—$CO_2H$), or the like. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, halogen atoms, or the like, or it may contain heteroatoms within the backbone of the hydrocarbyl residue.

In one embodiment, Q is the residuum of a phenol, including polyfunctional phenols, and includes radicals of the structure

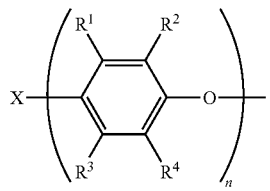

wherein $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbyloxy, $C_2$-$C_{12}$ halohydrocarbyloxy wherein at least two carbon atoms separate the halogen and oxygen atoms, or the like; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbyloxy, $C_2$-$C_{12}$ halohydrocarbyloxy wherein at least two carbon atoms separate the halogen and oxygen atoms, or the like; X may be hydrogen, $C_1$-$C_{18}$ hydrocarbyl, or $C_1$-$C_{18}$ hydrocarbyl containing a substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; n (i.e., the number of phenylene ether units bound to X) is 1 to about 100, preferably 1 to 3, and more preferably 1 to 2. Q may be the residuum of a monohydric phenol, such as 2,6-dimethylphenol, in which case n is 1. Q may also be the residuum of a diphenol, such as 2,2',6,6'-tetramethyl-4,4'-diphenol, in which case n is 2.

The uncapped poly(arylene ether) may be defined by reference to the capped poly(arylene ether) Q(J-K)$_y$ as Q(J-H)$_y$, where Q, J and y are defined above, and a hydrogen atom, H, has taken the place of any capping group, K. In one embodiment, the uncapped poly(arylene ether) consists essentially of the polymerization product of at least one monohydric phenol having the structure

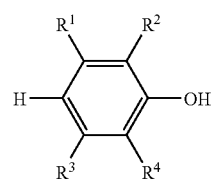

wherein $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbyloxy, $C_2$-$C_{12}$ halohydrocarbyloxy wherein at least two carbon atoms separate the halogen and oxygen atoms, or the like; and $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbyloxy, $C_2$-$C_{12}$ halohydrocarbyloxy wherein at least two carbon atoms separate the halogen and oxygen atoms, or the like. Suitable monohydric phenols include those described, for example, in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol. Thus, the uncapped poly(arylene ether) may comprise poly(2,6-dimethyl-1,4-phenylene ether), poly(2,6-dimethyl-1,4-phenylene ether-co-2,3,6-trimethyl-1,4-phenylene ether), or a mixture thereof. In one embodiment, the uncapped poly(phenylene ether) is isolated by precipitation and preferably has less than about 400 parts per million of organic impurities and more preferably less than about 300 parts per million. Organic impurities include, for example, 2,3-dihydrobenzofuran, 2,4,6-trimethylanisole, 2,6-dimethylcyclohexanone, 7-methyl-2,3-dihydrobenzofuran, and the like.

In one embodiment, the capped poly(arylene ether) comprises at least one capping group having the structure

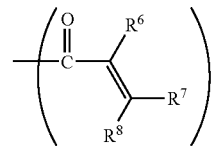

wherein $R^6$-$R^8$ are each independently hydrogen, $C_1$-$C_{18}$ hydrocarbyl, $C_2$-$C_{18}$ hydrocarbyloxycarbonyl, nitrile, formyl, carboxylic acid, imidate, thiocarboxylic acid, or the like. Highly preferred capping groups include acrylate ($R^6$=$R^7$=$R^8$=hydrogen) and methacrylate ($R^6$=methyl, $R^7$=$R^8$=hydrogen). It will be understood that the term "(meth)acrylate" means either acrylate or methacrylate.

In another embodiment, the capped poly(arylene ether) comprises at least one capping group having the structure

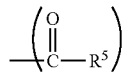

wherein $R^5$ is $C_1$-$C_{12}$ hydrocarbyl optionally substituted with one or two carboxylic acid groups, or the like, preferably $C_1$-$C_6$ alkyl, more preferably methyl, ethyl, or isopropyl. The advantageous properties of the invention can be achieved even when the capped poly(arylene ether) lacks a polymerizable function such as a carbon-carbon double bond.

In yet another embodiment, the capped poly(arylene ether) comprises at least one capping group having the structure

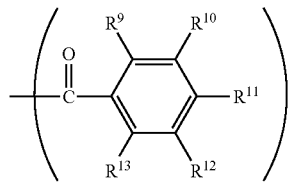

wherein $R^9$-$R^{13}$ are each independently hydrogen, halogen, $C_1$-$C_{12}$ alkyl, hydroxy, amino, carboxylic acid, or the like. Preferred capping groups of this type include salicylate ($R^9$=hydroxy, $R^{10}$-$R^{13}$=hydrogen).

The capped poly(arylene ether) is formed by the reaction of an uncapped poly(arylene ether) with an anhydride capping agent. In one embodiment, the anhydride capping agent may have the structure

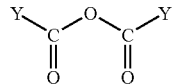

wherein each occurrence of Y is independently

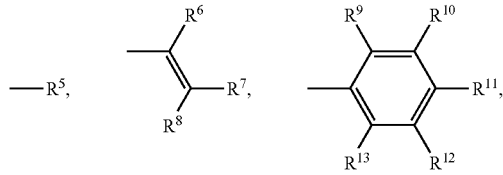

or the like, wherein $R^5$ is $C_1$-$C_{12}$ hydrocarbyl optionally substituted with one or two carboxylic acid groups, or the like; $R^6$-$R^8$ are each independently hydrogen, $C_1$-$C_{18}$ hydrocarbyl, $C_2$-$C_{18}$ hydrocarbyloxycarbonyl, nitrile, formyl, carboxylic acid, imidate, or thiocarboxylic acid; and $R^9$-$R^{13}$ are each independently hydrogen, halogen, $C_1$-$C_{12}$ alkyl, hydroxy, amino, amino, carboxylic acid, or the like. Examples of suitable anhydride capping agents include, for example, acetic anhydride, succinic anhydride, maleic anhydride, salicylic anhydride, phthalic anhydride, acrylic anhydride, methacrylic anhydride, and the like, and combinations thereof. It will be understood that the anhydride capping agent further includes diacids capable of forming the corresponding cyclic anhydride under the capping reaction conditions. Such diacids include, for example, maleic acid, malic acid, citraconic acid, itaconic acid, phthalic acid, and the like.

In one embodiment, the anhydride capping agent has the structure

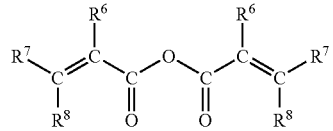

wherein each occurrence of $R^6$-$R^8$ is $C_1$-$C_{18}$ hydrocarbyl, $C_2$-$C_{12}$ hydrocarbyloxycarbonyl, nitrile, formyl, carboxylic acid, imidate, thiocarboxylic acid, or the like. In another embodiment, the anhydride capping agent comprises acrylic anhydride, methacrylic anhydride, or a mixture thereof.

Methods of reacting an uncapped poly(arylene ether) with an anhydride capping agent are described, for example, in U.S. Pat. Nos. 3,375,228 to Holoch et al., 4,148,843 to Goossens, 4,806,602 to White et al., 5,219,951 to Nelissen et al., 6,384,176 to Braat et al; U.S. Patent Application Publication No. 2001/0053820 A1 to Yeager et al.; and European Patent No. 261,574 B1 to Peters et al.

In one embodiment, the curable composition includes an alkenyl aromatic monomer, and the capped poly(arylene ether) is prepared by reaction of an uncapped poly(arylene ether) with an anhydride in the alkenyl aromatic monomer as solvent.

There is no particular limitation on the molecular weight or intrinsic viscosity of the capped poly(arylene ether). In one embodiment, the composition may comprise a capped poly (arylene ether) having a number average molecular weight of about 1,000 to about 25,000 atomic mass units (AMU). Within this range, it may be preferable to use a capped poly (arylene ether) having a number average molecular weight of at least about 2,000 AMU, more preferably at least about 4,000 AMU. In another embodiment, the composition may comprise a capped poly(arylene ether) having an intrinsic viscosity of about 0.05 to about 0.6 deciliters per gram (dL/g) as measured in chloroform at 25° C. Within this range, the capped poly(arylene ether) intrinsic viscosity may preferably be at least about 0.08 dL/g, more preferably at least about 0.1 dL/g. Also within this range, the capped poly(arylene ether) intrinsic viscosity may preferably be up to about 0.5 dL/g, still more preferably up to about 0.4 dL/g, even more preferably up to about 0.3 dL/g. Generally, the intrinsic viscosity of a capped poly(arylene ether) will vary insignificantly from the intrinsic viscosity of the corresponding uncapped poly (arylene ether). Specifically, the intrinsic viscosity of a capped poly(arylene ether) will generally be within 10% of that of the uncapped poly(arylene ether). It is expressly contemplated to employ blends of at least two capped poly (arylene ether)s having different molecular weights and intrinsic viscosities. The composition may comprise a blend of at least two functionalized poly(arylene ethers). Such blends may be prepared from individually prepared and isolated functionalized poly(arylene ethers). Alternatively, such blends may be prepared by reacting a single poly(arylene ether) with at least two functionalizing agents. For example, a poly(arylene ether) may be reacted with two capping agents, or a poly(arylene ether) may be metallized and reacted with two unsaturated alkylating agents. In another alternative, a mixture of at least two poly(arylene ether) resins having different monomer compositions and/or molecular weights may be reacted with a single functionalizing agent. The composition may, optionally, comprise a blend of a capped poly(arylene ether) resin and an uncapped poly(arylene ether) resin, and these two components may, optionally, have different intrinsic viscosities.

A capping catalyst may be employed in the reaction of an uncapped poly(arylene ether) with an anhydride. Examples of such compounds include those known to the art that are capable of catalyzing condensation of phenols with the capping agents described above. Useful materials include, but are not limited to, basic compounds including, for example, hydroxide salts such as sodium hydroxide, potassium hydroxide, tetraalkylammonium hydroxides, and the like; tertiary alkylamines such as tributylamine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-dimethylaminopyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

In one embodiment, the capping catalyst is an organic amine catalyst. Preferred organic amine catalysts include, for example, tertiary alkylamines, tertiary mixed alkyl-aryl amines, heterocyclic amines, and the like. It will be understood that the organic amine catalyst includes ammonium ions formed by protonation of the organic amine. In one embodiment, the capping catalyst comprises a 4-dialkylaminopyridine having the structure

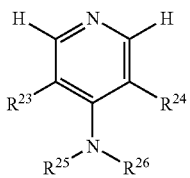

wherein $R^{23}$ and $R^{24}$ are each independently hydrogen or $C_1$-$C_6$ alkyl, and $R^{25}$ and $R^{26}$ are each independently $C_1$-$C_6$ alkyl. In a preferred embodiment, the capping catalyst comprises 4-dimethylaminopyridine (DMAP).

The curable composition may comprise about 5 to about 90 parts by weight of the capped poly(arylene ether) per 100 parts by weight total of the capped poly(arylene ether) and the olefinically unsaturated monomer. Within this range, the amount of the capped poly(arylene ether) resin may preferably be at least about 10 parts by weight, more preferably at least about 15 parts by weight. Also within this range, the amount of the capped poly(arylene ether) resin may preferably be up to about 80 parts by weight, more preferably up to about 60 parts by weight, still more preferably up to about 50 parts by weight.

The curable composition includes an olefinically unsaturated monomer. The olefinically unsaturated monomer is herein defined as a polymerizable monomer comprising a carbon-carbon double bound. Suitable olefinically unsaturated monomers include, for example, alkenyl aromatic monomers, allylic monomers, acryloyl monomers, and the like, and mixtures thereof.

The alkenyl aromatic monomer may have the formula

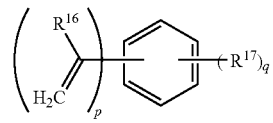

wherein each occurrence of $R^{16}$ is independently hydrogen or $C_1$-$C_{18}$ hydrocarbyl; each occurrence of $R^{17}$ is independently halogen, $C_1$-$C_{12}$ alkyl, $C_1$-$C_{12}$ alkoxyl, or $C_6$-$C_{18}$ aryl; p is 1 to 4; and q is 0 to 5. Unspecified positions on the aromatic ring are substituted with hydrogen atoms. Suitable alkenyl aromatic monomers include, for example, styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. Styrene is a particularly preferred alkenyl aromatic monomer.

The olefinically unsaturated monomer may be an allylic monomer. An allylic monomer is an organic compound comprising at least one, preferably at least two, more preferably at least three allyl (—CH$_2$—CH═CH$_2$) groups. Suitable allylic monomers include, for example, diallyl phthalate, diallyl isophthalate, triallyl mellitate, triallyl mesate, triallyl benzenes, triallyl cyanurate, triallyl isocyanurate, mixtures thereof, partial polymerization products prepared therefrom, and the like.

The olefinically unsaturated monomer may be an acryloyl monomer. An acryloyl monomer is a compound comprising at least one acryloyl moiety having the structure

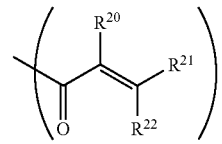

wherein $R^{20}$-$R^{22}$ are each independently hydrogen, $C_1$-$C_{12}$ hydrocarbyl, $C_2$-$C_{18}$ hydrocarbyloxycarbonyl, nitrile, formyl, carboxylic acid, imidate, thiocarboxylic acid, or the like. In one embodiment, the acryloyl monomer comprises at least two acryloyl moieties. In another embodiment, the acryloyl monomer comprises at least three acryloyl moieties. Suitable acryloyl monomers include, for example, trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl(meth)acrylate, methyl(meth)acrylate, methacryloxypropyl trimethoxysilane (also known as 3-(trimethoxysilyl)propyl methacrylate), ethoxylated (2) bisphenol A di(meth)acrylate (it will be understood that the number following the ethoxylated term refers to the average number of ethoxy groups in the ethoxylate chain attached to each oxygen of bisphenol A), and the like, and mixtures comprising at least one of the foregoing acryloyl monomers.

In one embodiment, the olefinically unsaturated monomer comprises styrene and trimethylolpropane trimethacrylate.

The composition may generally comprise about 10 to about 95 parts by weight of the olefinically unsaturated monomer per 100 parts by weight total of the capped poly(arylene ether) and the olefinically unsaturated monomer. Within this range, it may be preferable to use an olefinically unsaturated monomer amount of at least about 20 parts by weight, more preferably at least about 30 parts by weight. Also within this range, it may be preferable to use an olefinically unsaturated monomer amount of up to about 80 parts per weight, more preferably up to about 60 parts by weight.

The composition after curing absorbs less than about 1 weight percent, preferably less than about 0.5 weight percent, more preferably less than about 0.3 weight percent, even more preferably less than about 0.2 weight percent, of water after seven days exposure to 85° C. and 85% relative humidity. The present inventors believe that such low levels of water absorption have not been achieved by previously disclosed poly(arylene ether) curable compositions. The present inventors have discovered that water absorption by the cured composition may be reduced if the capped poly(arylene ether) is isolated and/or purified by a method that reduces the residual concentration of one or more of the following capping-related reagents and by-products: anhydride capping agent, free acid(s) obtained on hydrolysis of the anhydride capping agent, organic amine, and salts formed between organic amine and the anhydride capping agent or its free acid hydrolysis product. Reduced water absorption is typically associated with beneficial properties including higher glass transition temperature under high humidity conditions, lower coefficient of thermal expansion under high humidity conditions, greater flexural strength at high humidity conditions, and greater toughness under high humidity conditions.

In one embodiment, the composition comprises less than 50, preferably less than 30, more preferably less than 10, parts per million of the anhydride capping agent, based on the weight of the capped poly(arylene ether). Previous descriptions of capped poly(arylene ether) resins and curable compositions containing them did not recognize the importance of reducing the concentrations of residues comprising anhydride, nor did they teach methods of attaining such low concentrations. The low anhydride concentrations may be achieved by a variety of methods. For example, as shown in the working examples, precipitation of the capped poly(arylene ether) by combining the capping reaction mixture with a $C_2$-$C_6$ alkanol, such as isopropanol, yields unexpectedly low anhydride concentrations. Suitable $C_2$-$C_6$ alkanols include, for example, ethanol, n-propanol, isopropanol, 1-butanol, 2-butanol, 2-methyl-1-propanol (isobutanol), 2-methyl-2-propanol (t-butanol), 1-pentanol, 2-pentanol, 3-pentanol, 2-methyl-1-butanol, 2-methyl-2-butanol, 3-methyl-2-butanol, 3-methyl-1-butanol, 2,2-dimethyl-1-propanol, cyclopentanol, 1-hexanol, 2-hexanol, 3-hexanol, 5-methyl-1-pentanol, 5-methyl-2-pentanol, 2-methyl-3-pentanol, 2-methyl-2-pentanol, 2-methyl-1-pentanol, 3-methyl-1-pentanol, 3-methyl-2-pentanol, 3-methyl-3-pentanol, 2-ethyl-1-butanol, 2,2-dimethyl-1-butanol, 3,3-dimethyl-2-butanol, 3,3-dimethyl-1-butanol, 2,3-dimethyl-1-butanol, 2,3-dimethyl-2-butanol, 1-methylcyclopentanol, 2-methylcyclopentanol, 3-methylcyclopentanol, cyclopentylmethanol, cyclohexanol, and the like, and mixtures thereof A preferred $C_2$-$C_6$ alkanol is isopropanol. While not necessarily sufficient to achieve an anhydride concentration less than 50 parts per million by weight (ppm), precipitations with other antisolvents may achieve substantial reductions in anhydride concentration. Such other antisolvents include, for example, methanol, ketones having three to about ten carbon atoms, alkanes having five to about ten carbon atoms, and the like, and mixtures thereof. Substantial reductions in anhydride concentration, as well as the concentrations of other impurities, may also be achieved by washing the capping reaction mixture with an aqueous solution. The aqueous solution includes water and may, optionally, include acids, bases, or salts to facilitate extraction and/or conversion of anhydride from the capped poly(arylene ether) solution. As one example, the aqueous wash may have a pH of about 1 to about 7. As another example, the aqueous wash may have a pH of about 7 to about 13. As another example, the water wash may contain sodium hydroxide at about 0.0001 to about 1 normal to facilitate extraction of free acids, and hydrolysis and extraction of anhydrides. As another example, the water wash may contain hydrochloric acid at 0.0001 to about 1 normal to facilitate extraction of basic species, such as 4-dimethylaminopyridine. Efficient extraction of both basic and acidic impurities may be effected with sequential washes in acid and base, or vice versa. For example, a wash at an acidic pH (e.g., a pH of about 1 to 7) and buffer strength sufficient to remove substantially all basic residues may be followed by a wash at a basic pH (e.g., a pH of about 7 to about 13) and a buffer strength sufficient to remove substantially all acidic residues, wherein "substantially all" in various embodiments means greater than about 90 wt. %, or greater than about 95 wt. %, or greater than about 98 wt. % or greater than about 99 wt. %, or greater than about 99.5 wt. % based on the weight of residue originally present. In one embodiment, essentially all of said residue is removed meaning that the residue cannot be detected using normal analytical techniques. Another method for achieving substantial reductions in anhydride concentration is by devolatilization of a capping reaction mixture. Devolatilization methods are described, for example, in U.S. Pat. No. 6,384,176 B2 to Braat et al. Although the devolatilization methods previously taught do not appear to be sufficient to achieve an anhydride concentration of less than 50 ppm, that level may be achieved by the use of devolatilization in combination with a pre-treatment, such as aqueous washing.

The above methods for reducing the anhydride concentration may have the additional benefit of reducing the concentrations of other polar impurities. For example, they may reduce the concentration of free acid derived from anhydride hydrolysis to less than about 1 weight percent, preferably less than about 0.8 weight percent, more preferably less than about 0.7 weight percent, based on the weight of the capped poly(arylene ether). When the anhydride is acyclic and symmetrical, as is preferred, its hydrolysis generates two molecules of free acid. When the anhydride is acyclic and unsymmetrical, "a free acid" in the above limitation corresponds to either of the two acids formed by anhydride hydrolysis. When the anhydride is cyclic, its hydrolysis generates one molecule of a dicarboxylic acid, and "a free acid" in the above limitation corresponds to the dicarboxylic acid. Thus, one embodiment is a curable composition, comprising: an olefinically unsaturated monomer; and a capped poly(arylene ether) prepared by the reaction of an uncapped poly(arylene ether) with an anhydride capping agent; wherein the composition comprises less than 1 weight percent of a free acid obtained on hydrolysis of the anhydride capping agent, based on the weight of the capped poly(arylene ether). The above methods for reducing the anhydride concentration may also reduce the concentration of any organic amine present. Specifically, the above methods may reduce the organic amine concentration to less than about 1,000 parts per million, preferably less than about 600 parts per million, more preferably less than about 400 parts per million, based on the weight of the capped poly(arylene ether). For example, when capping of poly(2,6-dimethyl-1,4-phenylene ether) with methacrylic anhydride is catalyzed by 4-dimethylaminopyridine (DMAP), treatment of the reaction mixture as described above may reduce the residual concentration of DMAP to less than about 1,000 parts per million.

Another embodiment is a curable composition, comprising an olefinically unsaturated monomer; a particulate filler; and a capped poly(arylene ether) prepared by the reaction of an uncapped poly(arylene ether) with an anhydride capping agent; wherein the capped poly(arylene ether) is isolated by a procedure comprising precipitation with a $C_2$-$C_6$ alkanol; wherein the composition after curing absorbs less than 0.5 weight percent water after 7 days at 85° C. and 85 percent relative humidity.

Another embodiment is a curable composition, comprising about 1 to about 23 weight percent of a methacrylate-capped poly(2,6-dimethyl-1,4-phenylene ether) prepared by the reaction of an uncapped poly(2,6-dimethyl-1,4-phenylene ether) with methacrylic anhydride; wherein the methacrylate-capped poly(2,6-dimethyl-1,4-phenylene ether) is isolated by a procedure comprising precipitation with isopropanol; about 1 to about 23 weight percent of an acryloyl monomer comprising at least two acryloyl moieties; about 1 to about 23 weight percent of an alkenyl aromatic monomer selected from styrene, α-methylstyrene, 2-methylstyrene, 3-methylstyrene, 4-methylstyrene, 2-t-butylstyrene, 3-t-butylstyrene, 44-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and combinations thereof; and about 75 to about 95 weight percent of fused silica; wherein all weight percents are based on the total weight of the composition; and wherein the composition after curing absorbs less than 0.2 weight percent water after 7 days at 85° C. and 85 percent relative humidity. Preferred acryloyl monomers include trimethylolpropane trimethacrylate and ethoxylated (2) bisphenol A dimethacrylate.

The curable composition may, optionally, further comprise a curing catalyst to increase the curing rate of the unsaturated components. Curing catalysts, also referred to as initiators, are well known to the art and may be used to initiate the polymerization, curing, or crosslinking of numerous thermoplastics and thermosets including unsaturated polyester, vinyl ester and allylic thermosets. Non-limiting examples of curing catalysts are those described in U.S. Pat. Nos. 5,407,972 to Smith et al., and 5,218,030 to Katayose et al. The curing catalyst for the unsaturated portion of the thermoset may include any compound capable of producing free radicals at elevated temperatures. Such curing catalysts may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy)isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures comprising at least one of the foregoing curing catalysts. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts. The curing catalyst for the unsaturated portion of the thermoset may further include any compound capable of initiating anionic polymerization of the unsaturated components. Such anionic polymerization catalysts include, for example, alkali metal amides, such as sodium amide ($NaNH_2$) and lithium diethyl amide ($LiN(C_2H_5)_2$); alkali metal and ammonium salts of $C_1$-$C_{10}$ alkoxides; alkali metal and ammonium hydroxides; alkali metal cyanides; organometallic compounds such as the alkyl lithium compound n-butyl lithium and the Grignard reagent phenyl magnesium bromide; and the like; and combinations comprising at least one of the foregoing anionic polymerization catalysts. In a preferred embodiment, the curing catalyst may comprise t-butylperoxybenzoate or dicumyl peroxide. The curing catalyst may promote curing at a temperature in a range of about 0° C. to about 200° C.

When present, the curing catalyst may be used in an amount of about 0.1 to about 10 parts by weight per 100 parts total of the capped poly(arylene ether) and the olefinically unsaturated monomer. Within this range, it may be preferred to use a curing catalyst amount of at least about 0.5 parts by weight, more preferably at least about 1 part by weight. Also within this range, it may be preferred to use a curing catalyst amount of up to about 5 parts by weight, more preferably up to about 3 parts by weight.

The curable composition may, optionally, further comprise a curing promoter to decrease the gel time. Suitable curing promoters include transition metal salts and complexes such as cobalt naphthanate; and organic bases such as N,N-dimethylaniline (DMA) and N,N-diethylaniline (DEA). Preferably, cobalt naphthanate and DMA are used in combination. When present, the promoter may be used in an amount of about 0.05 to about 3 parts, per 100 parts total of the capped poly(arylene ether) and the olefinically unsaturated monomer.

The composition may, optionally, further comprise a curing inhibitor, which functions to prevent premature curing of the composition. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, p-methoxyphenol, 2,4,6-triphenylphenoxyl, pyrogallol, catechol, hydroquinone, monoalkylhydroquinones, t-butylhydroquinone, $C_1$-$C_6$-alkyl-substituted catechols, dialkylhydroquinones, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations comprising at least one of the foregoing curing inhibitors. Suitable curing inhibitors further include uncapped poly(arylene ether)s (i.e., poly (arylene ether)s having free hydroxyl groups). Preferred curing inhibitors include benzoquinone, hydroquinone, and tert-butylcatechol. When present, the curing inhibitor amount may be about 0.01 to about 10 parts by weight, per 100 parts by weight total of the capped poly(arylene ether) resin and the olefinically unsaturated monomer. Within this range, the curing inhibitor amount may preferably be at least about 0.1 part by weight. Also within this range, the curing inhibitor amount may preferably be up to about 2 parts by weight.

The composition may further comprise one or more fillers, including particulate fillers and fibrous fillers. Examples of such fillers are well known in the art and include those described in "Plastic Additives Handbook, 4$^{th}$ Edition" R. Gachter and H. Muller (eds.), P. P. Klemchuck (assoc. ed.) Hanser Publishers, New York 1993, pages 901-948. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having high thermal conductivity, low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (in its anhydrous, hemihydrated, dihydrated, or trihydrated forms), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, nodular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilane or acryloylsilane coatings to impart good physical properties to compounded blends; feldspar and nepheline syenite; silicate spheres; flue dust; cenospheres; fillite; aluminosilicate (armospheres), including silanized and metallized aluminosilicate; natural silica sand; quartz; quartzite; perlite; Tripoli; diatomaceous earth; synthetic silica, including those with various silane coatings, and the like.

Preferred particulate fillers include fused silica having an average particle size of about 1 to about 50 micrometers. A particularly preferred particulate filler comprises a first fused silica having a median particle size of about 0.03 micrometer to less than 1 micrometer, and a second fused silica having a median particle size of at least 1 micrometer to about 30 micrometers. The preferred fused silicas have essentially spherical particles, typically achieved by re-melting. Within the size range specified above, the first fused silica may preferably have a median particle size of at least about 0.1 micrometer, preferably at least about 0.2 micrometer. Also within the size range above, the first fused silica may preferably have a median particle size of up to about 0.9 micrometer, more preferably up to about 0.8 micrometer. Within the size range specified above, the second fused silica may preferably have a median particle size of at least about 2 micrometers, preferably at least about 4 micrometers. Also within the size range above, the second fused silica may preferably have a median particle size of up to about 25 micrometers, more preferably up to about 20 micrometers. In one embodiment, the composition comprises the first fused silica and the second fused silica in a weight ratio in a range of about 70:30 to about 99:1, preferably in a range of about 80:20 to about 95:5.

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Preferred fibrous fillers include glass fibers having a diameter in a range of about 5 to about 25 micrometers and a length before compounding in a range of about 0.5 to about 4 centimeters. Many other suitable fillers are described in U.S. Patent Application Publication No. 2001/0053820 A1 to Yeager et al.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1-3, R is an alkyl or aryl group and Y is a reactive functional group which can enable formation of a bond with a polymer molecule. Particularly useful examples of coupling agents are those having the structure $(RO)_3SiY$. Typical examples include vinyl triethoxysilane, vinyl tris(2-methoxy)silane, phenyl trimethoxysilane, γ-methacryloxypropyltrimethoxy silane, γ-aminopropyltriethoxysilane, γ-glycidoxypropyltrimethoxysilane, γ-mercaptopropyltrimethoxysilane, and the like. Silanes further include molecules lacking a reactive functional group, such as, for example, trimethoxyphenylsilane. Titanates include those developed by S. J. Monte et al. in Ann. Chem. Tech Conf. SPI (1980), Ann. Tech Conf. Reinforced Plastics and Composite Inst. SPI 1979, Section 16E, New Orleans; and S. J. Monte, Mod. Plastics Int., volume 14, number 6 pg. 2 (1984). Zirco-aluminates include those described by L. B. Cohen in Plastics Engineering, volume 39, number 11, page 29 (1983). The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

When present, the particulate filler may be used in an amount of about 5 to about 95 weight percent, based on the total weight of the composition. Within this range, it may be preferable to use a particulate filler amount of at least about 20 weight percent, more preferably at least about 40 weight percent, even more preferably at least about 75 weight percent. Also within this range, it may be preferable to use a particulate filler amount of up to about 93 weight percent, more preferably up to about 91 weight percent.

When present, the fibrous filler may be used in an amount of about 2 to about 80 weight percent, based on the total weight of the composition. Within this range, it may be preferred to use a fibrous filler amount of at least about 5 weight percent, more preferably at least about 10 weight percent, yet more preferably at least about 15 weight percent. Also within this range, it may be preferred to use a fibrous filler amount of up to about 60 weight percent, more preferably up to about 40 weight percent, still more preferably up to about 30 weight percent.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, antioxidants, heat stabilizers, light stabilizers, plasticizers, lubricants, flow modifiers, drip retardants, antiblocking agents, antistatic agents, flow-promoting agents, processing aids, substrate adhesion agents, mold release agents, toughening agents, low-profile additives, stress-relief additives, flame retardants, and the like, and combinations thereof. Those skilled in the art may select suitable additives and determine suitable amounts without undue experimentation.

There is no particular limitation on the method by which the composition is prepared, as long as it does not interfere with the ability of the cured composition to absorb less than 1 weight percent water after 7 days at 85° C. and 85 percent relative humidity. The composition may be prepared by forming an intimate blend comprising the capped poly(arylene ether) and the olefinically unsaturated monomer. The composition may be prepared from an uncapped poly(arylene ether) by dissolving the uncapped poly(arylene ether) in a portion of the olefinically unsaturated monomer, adding a capping agent to form the capped poly(arylene ether) in the presence of the olefinically unsaturated monomer, optionally washing the reaction mixture with an aqueous solution, and adding any other optional components to form the thermoset composition. In one embodiment, the composition may be prepared by blending an olefinically unsaturated monomer, and a capped poly(arylene ether) prepared by the reaction of an uncapped poly(arylene ether) with an anhydride capping agent and isolated by precipitation with a $C_2$-$C_6$ alkanol to form a curable composition; wherein the composition after curing absorbs less than 1 weight percent water after 7 days at 85° C. and 85 percent relative humidity. The $C_2$-$C_6$ alkanol preferably comprises isopropanol. In one embodiment, the composition may be prepared by capping the poly(arylene ether) in solution, washing the solution with an aqueous solution, separating the washed solution, precipitating the capped poly(arylene ether) by combining the washed solution with an antisolvent, drying the capped poly(arylene ether) under vacuum, and adding any other components to form the thermoset composition.

There is no particular limitation on the method by which the composition may be cured. The composition may, for example, be cured thermally or by using irradiation techniques, including radio frequency heating, UV irradiation and electron beam irradiation. For example, the composition may be cured by initiating chain-reaction curing with 10 seconds of radio frequency heating. When heat curing is used, the temperature selected may be in a range of about 80° to about 300° C. The heating period may be in a range of about 5 seconds to about 24 hours. Curing may be staged to produce a partially cured and often tack-free resin, which then is fully cured by heating for longer periods or at higher temperatures.

One embodiment is a cured composition obtained by curing any of the above-described curable compositions. It will be understood that the term "curing" includes partially curing and fully curing. Because the components of the curable composition may react with each other during curing, the cured compositions may be described as comprising the reaction products of the curable composition components.

Another embodiment is an article comprising any of the cured compositions. The curable composition is useful for fabricating a wide range of articles, and it is particularly suitable for use as an encapsulant for electronic devices. The composition exhibits highly desirable properties. Reduced water absorption properties are described above. In addition, in one embodiment, the cured composition may exhibit a UL94 flammability rating of V-1, preferably, V-0. The cured composition may exhibit a glass transition temperature of at least 120° C., preferably at least 130° C., more preferably at least 140° C.

The invention is further illustrated by the following non-limiting examples.

PREPARATIVE EXAMPLE 1

This example describes the preparation of a methacrylate-capped poly(2,6-dimethyl-1,4-phenylene ether) having an intrinsic viscosity of about 0.12 dL/g. Toluene (30.5 kg), and poly(2,6-dimethyl-1,4-phenylene ether) (30.5 kg; intrinsic viscosity 0.12 dL/g) were combined and heated to about 85° C. Dimethylaminopyridine (0.420 kg) was added. Once all solids appeared to dissolve, methacrylic anhydride (3.656 kg) was gradually added. The resulting solution was maintained at 85° C. for three hours with continuous mixing. The solution was then cooled to room temperature to yield a toluene solution of methacrylate-capped poly(2,6-dimethyl-1,4-phenylene ether).

PREPARATIVE EXAMPLE 2

This example describes the isolation of a methacrylate-capped poly(2,6-dimethyl-1,4-phenylene ether) by precipitation. A toluene solution of methacrylate-capped poly(2,6-dimethyl-1,4-phenylene ether) having an intrinsic viscosity of 0.12 dL/g was prepared as described in Preparative Example 1. The methacrylate-capped poly(2,6-dimethyl-1,4-phenylene ether) was precipitated by slowly adding two liters of the toluene solution to four liters of room temperature methanol, which was being vigorously stirred in a blender. The toluene solution is preferably warmed before addition to the methanol. Warming reduces the viscosity of the solution. The rate of addition of the toluene solution to the methanol was slow enough to continuously cause a stream of polymer to be precipitated as a fine dispersion, but not so fast as to allow the polymer to coagulate into a continuous strand. A volume ratio of methanol to toluene solution higher than 2:1 is acceptable, but much lower ratios may sometimes cause clumping and coagulation of the precipitated polymer. The precipitated polymer was filtered, washed with methanol, and dried overnight at 85° C.

PREPARATIVE EXAMPLES 3-9

Methacrylate-capped poly(2,6-dimethyl-1,4-phenylene ether) resins were isolated by precipitations that varied in the identity of the antisolvent and the method of combining the polyphenylene ether solution with the antisolvent. The solution of 50 weight percent methacrylate-capped poly(2,6-dimethyl-1,4-phenylene ether) (intrinsic viscosity=0.12 dL/g) was prepared by reaction of the corresponding uncapped polyphenylene ether (1406 g) with methacrylic anhydride (188.6 g) in toluene solvent (1406 g) with dimethylaminopyridine catalyst (17.9 g), as described above.

So-called "normal" precipitations, in which the toluene solution of capped polyphenylene ether was poured into the antisolvent, were conducted as follows. Four hundred milliliters of room temperature antisolvent (methanol, isopropanol, acetone, or methyl ethyl ketone (MEK)) were added to a WARING® blender equipped with a 1000 mL capacity glass container. While the antisolvent in the blender was agitated, a pre-weighed portion of approximately 140 grams of capped polyphenylene ether solution at about 40° C. was added drop-wise, causing precipitation of the capped polyphenylene ether. The resulting mixture was poured onto a PYREX® brand Büchner funnel with a coarse fitted disc, and a filter cake of the precipitated capped polyphenylene ether was allowed to form. Once a filter cake had formed, vacuum was applied to the filter to remove solvent. The precipitate was washed with an additional 50 mL of antisolvent, dried in a vacuum oven for 3.5 hours at 130° C., under 20 inches (508 millimeters) of vacuum with a flow of nitrogen at 15 standard cubic feet per hour (0.425 standard cubic meters per hour). After removal from the oven and cooling to ambient temperature the material was weighed.

So-called "reverse" precipitations, in which the antisolvent was poured into the toluene solution of polyphenylene ether, were conducted as follows. A pre-weighed portion of approximately 140 grams of capped polyphenylene ether solution at about 40° C. was added to the blender. While the contents of the blender were agitated, 400 mL of antisolvent was added over the course of about six minutes, causing precipitation of the capped polyphenylene ether. The resulting precipitate was filtered, washed, and dried as described for the "normal" precipitation.

Each precipitated capped polyphenylene ether was characterized by determining its molecular weight and residual impurities. Number average molecular weight ($M_n$) and weight average molecular weight ($M_w$), each expressed in units of atomic mass units (AMU), were determined using GPC (gel permeation chromatography) using polystyrene standards. Residual concentrations of toluene, methacrylic acid, methacrylic anhydride, and dimethylaminopyridine (DMAP), all expressed in ppm, were determined by gas chromatography using a flame ionization detector. Residual concentrations of the antisolvents (methanol, isopropanol and acetone), all expressed in ppm, were determined by gas chromatography/mass spectrometry (GC/MS). Results are presented in Table 1. The results show that the reverse method yields lower levels of toluene and methacrylic acid, and higher levels of DMAP than the normal method. The normal method with isopropanol yields an exceedingly and unexpectedly low level of residual methacrylic anhydride. The normal precipitation with MEK selectively precipitates higher molecular weight capped polyphenylene ether, but this selectivity comes at the expense of yield.

TABLE 1

|  | Prep. Ex. 3 | Prep. Ex. 4 | Prep. Ex. 5 | Prep. Ex. 6 |
|---|---|---|---|---|
| Precipitation Method | normal | normal | normal | normal |
| Antisolvent | methanol | isopropanol | acetone | MEK |
| Yield (%) | 97.3 | 99.1 | 64.3 | 30.9 |
| $M_n$ (AMU) | 2,822 | 3,051 | 4,345 | 6,144 |
| $M_w$ (AMU) | 7,024 | 7,191 | 8,832 | 11,949 |
| $M_n/M_w$ | 2.49 | 2.36 | 2.03 | 1.94 |
| Toluene (ppm) | 30,711 | 31,111 | 25,612 | 23,595 |
| Methacrylic acid (ppm) | 7,524 | 6,365 | 9,595 | 8,467 |
| Methacrylic anhydride (ppm) | 57 | 5 | 50 | 850 |
| DMAP (ppm) | 371 | 242 | 485 | 258 |
| Methanol (ppm) | ND | — | — | — |
| Isopropanol (ppm) | — | 19,846 | — | — |
| Acetone (ppm) | — | — | ND | — |

ND = not detected (less than 10 ppm for methanol, 100 ppm for isopropanol, and 100 ppm for acetone)

|  | Prep. Ex. 7 | Prep. Ex. 8 | Prep. Ex. 9 |
|---|---|---|---|
| Precipitation Method | reverse | reverse | reverse |
| Antisolvent | methanol | isopropanol | acetone |
| Yield (%) | 97.7 | 98.2 | 70.3 |
| $M_n$ (AMU) | 3,098.7 | 3,213.3 | 4,099.7 |
| $M_w$ (AMU) | 7,172.7 | 7,202.3 | 8,769.7 |
| $M_n/M_w$ | 2.31 | 2.24 | 2.14 |
| Toluene (ppm) | 4,174 | 4,418 | 38,358 |
| Methacrylic acid (ppm) | 1,229 | 2,097 | 7,809 |

TABLE 1-continued

| Methacrylic anhydride (ppm) | 185 | 177 | 75 |
|---|---|---|---|
| DMAP (ppm) | 738 | 504 | 522 |
| Methanol (ppm) | ND | — | — |
| Isopropanol (ppm) | — | ND | — |
| Acetone (ppm) | — | — | 352 |

ND = not detected (less than 10 ppm for methanol, and 100 ppm for isopropanol)

PREPARATIVE EXAMPLES 10 AND 11

A 50 weight percent solution of methacrylate-capped poly(2,6-dimethyl-1,4-phenylene ether) (intrinsic viscosity=0.12 dL/g) in toluene was prepared as described in the preceding example. Toluene was removed in a vacuum oven under two conditions: (1) 200° C. for four hours (Preparative Example 10), or (2) 100° C. for 2 hours (Preparative Example 11). The non-volatile residue was analyzed to determine capped poly(arylene ether) molecular weight and residual toluene, methacrylic acid, methacrylic anhydride, and DMAP. Results are presented in Table 2. The results show that there is a negligible effect on the molecular weight of the capped polyphenylene ether resins when isolated by devolatilization.

TABLE 2

|  | Prep. Ex. 10 | Prep. Ex. 11 |
|---|---|---|
| $M_n$ (AMU) | 3,260 | 3,260 |
| $M_w$ (AMU) | 7,240 | 7,240 |
| $M_n/M_w$ | 2.20 | 2.20 |
| Toluene (ppm) | 1,179 | 28,405 |
| Methacrylic acid (ppm) | 1,322 | 23,167 |
| Methacrylic anhydride (ppm) | 930 | 668 |
| DMAP (ppm) | 68 | 88 |

PREPARATIVE EXAMPLES 12-23

To reduce the amount of residual impurities, isolations were performed with a water wash prior to devolatilization. The solution of methacrylate-capped poly(2,6-dimethyl-1,4-phenylene ether) in toluene was warmed to a pre-determined temperature then mixed for 30 seconds by hand with an amount of warmed water. The mixture was centrifuged at 20,000 rotations per minute for two minutes and the organic layer was recovered. The organic layer was dried for 4 hours at 120° C. in a vacuum oven. The resulting powders were analyzed for methacrylic acid (MA), methacrylic anhydride (MAA), dimethylaminopyridine, and toluene. The washing conditions and results are shown in Table 3.

TABLE 3

|  | Amt PPE in solution (wt %) | Mixing Temp. (° C.) | Water/ Organic Ratio | MA (ppm) | MAA (ppm) | DMAP (ppm) | Toluene (ppm) |
|---|---|---|---|---|---|---|---|
| Prep. Ex. 12 | 20 | 21 | 1 | 6909 | 208 | 321 | 53670 |
| Prep. Ex. 13 | 20 | 21 | 2 | 5978 | 190 | 304 | 54790 |
| Prep. Ex. 14 | 20 | 50 | 1 | 3310 | 466 | 220 | 21380 |
| Prep. Ex. 15 | 20 | 50 | 2 | 2668 | 298 | 196 | 19700 |
| Prep. Ex. 16 | 35 | 21 | 1 | 9254 | 293 | 164 | 48380 |
| Prep. Ex. 17 | 35 | 21 | 2 | 8740 | 423 | 144 | 57810 |
| Prep. Ex. 18 | 35 | 50 | 1 | 9134 | 454 | 113 | 50270 |
| Prep. Ex. 19 | 35 | 50 | 2 | 6627 | 432 | 111 | 53290 |
| Prep. Ex. 20 | 50 | 21 | 1 | 24990 | 346 | 36 | 59750 |
| Prep. Ex. 21 | 50 | 21 | 2 | 25003 | 358 | 34 | 55070 |
| Prep. Ex. 22 | 50 | 50 | 1 | 9211 | 329 | 91 | 56830 |
| Prep. Ex. 23 | 50 | 50 | 2 | 6680 | 285 | 96 | 53560 |

The results show that a higher polyphenylene ether concentration in solution, higher mixing temperature, and higher water/organic ratio each improve (decrease) the concentrations of residual compounds in the isolated polyphenylene ether resin.

COMPARATIVE EXAMPLES 1-7

Seven compositions were prepared and molded. They all used methacrylate-capped poly(2,6-dimethyl-1,4-phenylene ether) resins provided as capping reaction mixtures in styrene that varied in the concentrations of methacrylic anhydride and dimethylaminopyridine employed in the capping reactions. Molar ratios of methacrylic anhydride to polyphenylene ether free hydroxyl groups and dimethylaminopyridine to polyphenylene ether free hydroxyl groups are given in Table 4. The percent conversion of uncapped polyphenylene ether to capped polyphenylene ether was determined for each capping reaction mixture by comparing the free hydroxyl end group contents of the uncapped polyphenylene ether resin and the capped polyphenylene ether resin in the reaction mixture. The free hydroxyl end group contents were determined by functionalization with a phosphorus reagent and $^{31}$P NMR as described in P. Chan, D. S. Argyropolis, D. M. White, G. W. Yeager, and A. S. Hay, Macromolecules, 1994, volume 27, pages 6371 ff. The uncapped polyphenylene ether resin had a free hydroxyl end group content of 0.1658 weight percent.

All molding compositions contained 29.2 weight percent methacrylate-capped polyphenylene ether, 54.1 weight percent styrene, 14.7 weight percent trimethylolpropane trimethacrylate, and 2.0 weight percent t-butyl peroxybenzoate. Molding compositions were prepared by mixing the styrene solution of methacrylate-capped polyphenylene ether with trimethylolpropane trimethacrylate and heating on a water bath until the components appeared well blended. The mixture was then heated to 140° C., degassed under vacuum for about ten minutes, and cooled to about 80-100° C. before t-butyl peroxybenzoate was added. The composition was then poured into a mold cavity and cured for 60 minutes at 90° C. followed by 60 minutes at 150° C.

Molded samples were pre-weighed, then immersed in boiling water and reweighed after one, four, and five days. Weight change values represent averages for three samples at each condition. Compositions and water absorption properties are summarized in Table 4. The results show that water absorption by cured samples was positively correlated with the concentrations of methacrylic anhydride and dimethylaminopyridine in the capping reaction mixture. The results further show that when the concentrations of methacrylic anhydride and dimethylaminopyridine were incrementally reduced, the extent of conversion of uncapped to capped polyphenylene ether was reduced, and the curing properties of the composition were compromised. It is therefore difficult to achieve essentially complete capping of the polyphenylene ether without using a substantial excess of the capping agent.

It was also observed that the transparency of the cured composition was inversely proportional to the concentration of methacrylic anhydride and dimethylaminopyridine used in the capping reaction mixture. In other words, cured disks prepared from capping mixtures having low concentrations of methacrylic anhydride and 4-dimethylaminopyridine exhibited low coloration and high transparency, whereas those prepared from capping mixtures having high concentrations exhibited higher coloration and lower transparency.

TABLE 4

|  | C. Ex. 1 | C. Ex. 2 | C. Ex. 3 |
|---|---|---|---|
| Compositions |  |  |  |
| Initial concentration of DMAP in PPE capping reaction mixture (wt %) | 1.38 | 0.69 | 0.69 |
| Initial concentration of MAA in PPE capping reaction mixture (wt %) | 12.0 | 6.00 | 6.00 |
| Molar ratio of MAA:OH | 21.3 | 10.6 | 10.6 |
| Molar ratio of DMAP:OH | 3.25 | 1.62 | 1.62 |
| Conversion of uncapped to capped PPE in capping reaction mixture (%) | 100.0 | 100.0 | 100.0 |
| Properties |  |  |  |
| Curing behavior | cured well | cured well | cured well |
| Weight gain after 1 day in boiling water (%) | 1.80 | 1.01 | 0.99 |
| Weight gain after 4 days in boiling water (%) | 2.70 | 1.30 | 1.28 |
| Weight gain after 5 days in boiling water (%) | 2.81 | 1.36 | 1.33 |

|  | C. Ex. 4 | C. Ex. 5 | C. Ex. 6 |
|---|---|---|---|
| Compositions |  |  |  |
| Initial concentration of DMAP in PPE capping reaction mixture (wt %) | 0.35 | 0.21 | 0.21 |
| Initial concentration of MAA in PPE capping reaction mixture (wt %) | 3.00 | 1.76 | 1.00 |

TABLE 4-continued

|  | | | |
|---|---|---|---|
| Molar ratio of MAA:OH | 5.32 | 3.12 | 1.77 |
| Molar ratio of DMAP:OH | 0.81 | 0.50 | 0.50 |
| Conversion of uncapped to capped PPE in capping reaction mixture (%) | 100.0 | 97.5 | 62.3 |
| Properties | | | |
| Curing behavior | cured well | cured well | cured slowly, incompletely |
| Weight gain after 1 day in boiling water (%) | 0.80 | 0.51 | — |
| Weight gain after 4 days in boiling water (%) | 0.95 | 0.51 | — |
| Weight gain after 5 days in boiling water (%) | 1.00 | 0.53 | — |

|  | C. Ex. 7 |
|---|---|
| Compositions | |
| Initial concentration of DMAP in PPE capping reaction mixture (wt %) | 0.21 |
| Initial concentration of MAA in PPE capping reaction mixture (wt %) | 0.66 |
| Molar ratio of MAA:PPE-OH | 1.17 |
| Molar ratio of DMAP:PPE-OH | 0.50 |
| Conversion of uncapped to capped PPE in capping reaction mixture (%) | 36.1 |
| Properties | |
| Curing behavior | did not cure |
| Weight gain after 1 day in boiling water (%) | — |
| Weight gain after 4 days in boiling water (%) | — |
| Weight gain after 5 days in boiling water (%) | — |

EXAMPLES 1 AND 2

Two compositions were prepared, varying in the presence or absence of a silane coupling agent. The methacrylate-capped poly(2,6-dimethyl-1,4-phenylene ether) (MA-PPE) either had an intrinsic viscosity of 0.30 dL/g (Example 1) or was a blend of 0.12 dL/g and 0.30 dL/g materials (Example 2). These polymers were isolated by precipitation using a procedure similar to that described in Preparative Example 2. Fused silicas were obtained from Denka as FB570 and SPF30. The silane coupling agent methacryloxypropyl trimethoxysilane (MAPTMS) was obtained from Dow Corning as Z-6030. The acryloyl monomer ethoxylated (2) bisphenol A dimethacrylate was obtained as SR-348 from Sartomer. An aluminophosphorus flame retardant was obtained as OP930 from Clariant. A mold release agent was obtained as LICO-WAX® OP from Clariant. For Example 2, the silane coupling agent was incorporated into the composition by pre-blending with the two fused silicas and exposing the resulting mixture to two hours at 85° C. before mixing it with the remaining components. Cured disks were prepared by compression molding the composition for ten minutes at 160° C. and further cured for two hours at 175° C. Bars having dimensions one-eighth inch (0.3175 centimeter) by one-half inch (1.27 centimeters) by four inches (10.16 centimeters) were cut from the disks. Bars were dried for one hour at 115° C., then weighed, exposed to 85° C. and 85% relative humidity (RH) for times ranging from one to seven days, then reweighed. Compositions and water absorption results are given in Table 5. Component amounts are expressed in parts by weight. The weight changes in Table 5 are expressed as a percentage increase in weight relative to the original, pre-dried weight of the sample. The results show that both samples absorbed less than 0.2 weight percent water after seven days at 85° C. and 85% relative humidity.

TABLE 5

|  | Ex. 1 | Ex. 2 |
|---|---|---|
| MA-PPE, 0.12 dL/g | — | 6.13 |
| MA-PPE, 0.30 dL/g | 15.75 | 9.62 |
| Ethoxylated (2) bisphenol A dimethacrylate | 52.76 | 52.76 |
| Pigment | 0.24 | 0.24 |
| Dicumyl peroxide | 1.97 | 1.97 |
| 4-t-Butyl catechol | 0.16 | 0.16 |
| Fused silica, FB570 | 398.1 | 398.1 |
| Fused silica, SFP30M | 44.2 | 44.2 |
| Methacryloxypropyl trimethoxysilane | — | 3.93 |
| Flame retardant | 7.88 | 7.88 |
| Mold release agent | — | 2.10 |
| Water absorption after 1 day (%) | 0.0811 | 0.1159 |
| Water absorption after 2 days (%) | 0.1186 | 0.1375 |
| Water absorption after 3 days (%) | 0.1366 | 0.1527 |
| Water absorption after 7 days (%) | 0.1482 | 0.1619 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of preparing a curable composition, comprising:
   blending
   about 1 to about 23 weight percent of a capped poly(arylene ether) prepared by the reaction of an uncapped poly(arylene ether) with an anhydride capping agent; wherein the uncapped poly(arylene ether) comprises poly(2,6-dimethyl-1,4-phenylene ether), poly(2,6-dimethyl-1,4-phenylene ether-co-2,3,6-trimethyl-1,4-phenylene ether), or a mixture thereof; and wherein preparing the capped poly(arylene ether) further comprises precipitating the capped poly(arylene ether) by adding a solution of the capped poly(arylene ether) to isopropanol; wherein the capped poly(arylene ether) is a methacrylate-capped poly(2,6-dimethyl-1,4-phenylene ether) prepared by the reaction of an uncapped poly(2,6-dimethyl-1,4-phenylene ether) with methacrylic anhydride; wherein the methacrylate-capped poly(2,6-dimethyl-1,4-phenylene ether) is isolated by a procedure comprising precipitation with isopropanol; and
   an olefinically unsaturated monomer comprising about 1 to about 23 weight percent of an acryloyl monomer comprising at least two acryloyl moieties; and about 1 to about 23 weight percent of an alkenyl aromatic monomer selected from styrene, a-methyl styrene, 2-methylstyrene, 3-methylstyrene, 4-methylstyrene,-

2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and combinations thereof; and
about 75 to about 95 weight percent of fused silica
to form a curable composition;
wherein all weight percents are based on the total weight of the curable composition; and
wherein the composition after curing absorbs less than 0.2 weight percent water after 7 days at 85° C. and 85 percent relative humidity.

2. The method of claim 1, wherein the alkenyl aromatic monomer comprises styrene and the acryloyl monomer comprises trimethylolpropane trimethacrylate or ethoxylated (2) bisphenol A dimethacrylate.

* * * * *